United States Patent
Tal et al.

(10) Patent No.: US 10,789,175 B2
(45) Date of Patent: Sep. 29, 2020

(54) CACHING POLICY IN A MULTICORE SYSTEM ON A CHIP (SOC)

(71) Applicant: Mellanox Technologies Ltd., Yokneam (IL)

(72) Inventors: Gilad Tal, Yokneam (IL); Gil Moran, Yokneam (IL); Miriam Menes, Yokneam (IL); Gil Kopilov, Yokneam (IL); Shlomo Raikin, Yokneam (IL)

(73) Assignee: Mellanox Technologies Ltd., Yokneam (IL)

(*) Notice: Subject to any disclaimer, the term of this patent is extended or adjusted under 35 U.S.C. 154(b) by 0 days.

(21) Appl. No.: 15/610,823

(22) Filed: Jun. 1, 2017

(65) Prior Publication Data

US 2018/0349292 A1 Dec. 6, 2018

(51) Int. Cl.
*G06F 12/123* (2016.01)
*G06F 12/0808* (2016.01)

(52) U.S. Cl.
CPC ........ *G06F 12/123* (2013.01); *G06F 12/0808* (2013.01); *G06F 2212/1044* (2013.01); *G06F 2212/60* (2013.01); *G06F 2212/601* (2013.01); *G06F 2212/62* (2013.01)

(58) Field of Classification Search
None
See application file for complete search history.

(56) References Cited

U.S. PATENT DOCUMENTS

| 5,835,766 | A | 11/1998 | Iba | |
|---|---|---|---|---|
| 6,266,744 | B1* | 7/2001 | Hughes | G06F 9/3834 711/123 |
| 6,535,958 | B1* | 3/2003 | Fuoco | G06F 12/0802 711/122 |
| 7,340,577 | B1* | 3/2008 | Van Dyke | G06F 13/4243 711/167 |
| 8,738,860 | B1 | 5/2014 | Griffin | |
| 9,514,006 | B1 | 12/2016 | Busaba | |
| 9,842,031 | B1 | 12/2017 | Kharatishvill | |
| 2001/0001873 | A1* | 5/2001 | Wickeraad | G06F 12/121 711/136 |
| 2001/0049714 | A1 | 12/2001 | Kikuchi | |
| 2002/0006054 | A1* | 1/2002 | Shukuri | B82Y 10/00 365/145 |
| 2002/0144061 | A1* | 10/2002 | Faanes | G06F 9/3004 711/126 |
| 2003/0033386 | A1* | 2/2003 | Dahlen | G06F 17/30312 709/220 |

(Continued)

*Primary Examiner* — Sean D Rossiter
*Assistant Examiner* — Stephanie Wu
(74) *Attorney, Agent, or Firm* — Fish & Richardson P.C.

(57) ABSTRACT

A computing system comprises one or more cores. Each core comprises a processor and switch with each processor coupled to a communication network among the cores. Also disclosed are techniques for implementing an adaptive last level allocation policy in a last level cache in a multicore system receiving one or more new blocks for allocating for storage in the cache, accessing a selected profile from plural profiles that define allocation actions, according to a least recently used type of allocation and based on a cache action, a state bit, and traffic pattern type for the new blocks of data and handling the new block according to the selected profile for a selected least recently used (LRU) position in the cache.

20 Claims, 7 Drawing Sheets

(56) References Cited

U.S. PATENT DOCUMENTS

| | | | |
|---|---|---|---|
| 2005/0223165 A1* | 10/2005 | Schmidt | G06F 12/0866 711/113 |
| 2006/0143395 A1* | 6/2006 | Zohar | G06F 12/126 711/133 |
| 2007/0203910 A1 | 8/2007 | Ferguson | |
| 2008/0086594 A1* | 4/2008 | Chang | G06F 9/3824 711/118 |
| 2009/0113132 A1* | 4/2009 | Cain, III | G06F 12/127 711/133 |
| 2011/0010502 A1* | 1/2011 | Wang | G06F 12/121 711/128 |
| 2011/0029498 A1 | 2/2011 | Ferguson | |
| 2011/0167221 A1* | 7/2011 | Pangal | G06F 11/1453 711/117 |
| 2012/0221774 A1* | 8/2012 | Atkisson | G06F 12/0802 711/103 |
| 2013/0173861 A1* | 7/2013 | Comparan | G06F 12/0817 711/122 |
| 2013/0191599 A1* | 7/2013 | Busaba | G06F 12/0875 711/136 |
| 2013/0243190 A1* | 9/2013 | Yang | H04L 9/0816 380/44 |
| 2013/0346708 A1 | 12/2013 | Nashimoto | |
| 2014/0173214 A1* | 6/2014 | Ramrakhyani | G06F 12/126 711/135 |
| 2014/0368524 A1* | 12/2014 | Srinivasan | G06F 12/0802 345/557 |
| 2014/0375661 A1* | 12/2014 | Koker | G06T 1/60 345/537 |
| 2015/0089159 A1* | 3/2015 | Busaba | G06F 12/0817 711/144 |
| 2015/0234745 A1* | 8/2015 | Roy | G06F 12/0862 711/125 |
| 2015/0279436 A1* | 10/2015 | Ryoo | G11C 8/06 711/105 |
| 2016/0150003 A1* | 5/2016 | Magdon-Ismail | G06F 12/00 709/223 |
| 2016/0239432 A1* | 8/2016 | Zhuang | G06F 12/12 |
| 2016/0267018 A1* | 9/2016 | Shimizu | G06F 12/126 |
| 2016/0378658 A1 | 12/2016 | Gschwind | |
| 2016/0378659 A1 | 12/2016 | Gschwind | |
| 2017/0039144 A1* | 2/2017 | Wang | G06F 12/123 |
| 2017/0116118 A1* | 4/2017 | Artieri | G06F 12/084 |
| 2017/0149926 A1* | 5/2017 | Wang | H04L 45/745 |
| 2017/0177479 A1* | 6/2017 | Salyers | G06F 11/1464 |
| 2017/0322885 A1* | 11/2017 | Mukherjee | G06F 12/0862 |
| 2018/0107604 A1* | 4/2018 | Dooley | G06F 12/1027 |
| 2018/0117810 A1 | 5/2018 | Gschwind | |

* cited by examiner

CACHING POLICY IN A MULTICORE SYSTEM ON A CHIP (SOC)

BACKGROUND

This description relates to computing in parallel processing environments.

FPGAs (Field Programmable Gate Arrays) and ASICs (Application Specific Integrated Circuits) are two exemplary approaches for implementing customized logic circuits. Costs associated with ASICs include verification, physical design, timing closure, and non-recurring costs. Unlike an ASIC, an FPGA is reprogrammable in that it can be reconfigured for each application and changed even after the design has been shipped to customers, much like software can be updated. However, FPGAs are typically more expensive than an ASIC. FPGAs typically consume more power and lower performance compared to an ASIC.

Multicore systems (e.g., tiled processors) or multicore core systems on a chip (SOC) use parallel processing to achieve some features of both ASICs and FPGAs. For example, some multicore systems are power efficient like an ASIC because they use custom logic for some functions, and reconfigurable like FPGAs because they are programmable in software.

Multicore systems include cache memory and cache controller units. Cache can be multi-level, typically two or three levels and caches can be distributed and can be associated with cores of a multi core system. Several types of caches are known. One type is a direct cache and another is a set associative cache. A set associative cache is a multi-way-direct-mapped cache that has plural, identical direct-mapped caches referred to as sets that are addressed in the same manner. For each entry a set of cache lines are available for storage.

Several types of replacement policies are known. One type is a FIFO (first in first out) without regard to how often or how frequently that data were accessed. Another type is LIFO (last in first out), which behaves opposite to FIFO. Another policy is MRU (most recently used) which replaces the most recently used items first. Another policy is Random Replacement (RR) that randomly selects a candidate item to discard when it is necessary to allocate in a cache.

A replacement policy algorithm commonly used for caches such as a set associative cache is least recently used (LRU) policy. A LRU policy selects a victim way to be evicted on an allocation of a new cache line (i.e., a cache block) by replacing the least recently accessed cache line.

Some cache implementations also use lock bits per line to explicitly protect a line from being evicted. The static nature of a lock bit can degrade cache associativity and in extreme cases completely eliminates new allocations from an entire set. Additionally, various algorithms are used to decide on allocation in the last level cache, bypassing the cache and writing through the cache, each optimizing a different scenario and target different goals, such as increasing high hit, minimizing thrashing of useful data, avoiding late dirty write back etc.

SUMMARY

In an SOC a large proportion of internal requests arriving at the last level cache (cache closest to main memory) are from IO devices without lower cache levels. The aggregate IO bandwidth required because of these internal requests can often exceed the external memory bandwidth. Processors have L1 data and instruction caches and typically also have an L2 unified cache, which would filter the majority of the traffic generated by the processors to the LLC. Therefore, in many instances allocating a cache line from the processor in the last level cache (LLC) for L1 and L2 cache read-miss accesses is not desired (as that may thrash useful data in the LLC), while the cache line can be allocated in the unified L2 cache or the core's L1 cache.

With a set associative cache that uses a LRU replacement policy, a newly allocated block will cause the eviction of the least recently used entry (called here LRU position 0) and allocation of the newly allocated block as the most recently used (MRU) referred to here as LRU position K−1, where K is the set associativity. The conventional LRU allocation is a fixed decision that assumes that access to the newly allocated block is the most probable to be accessed again in short period of time. This assumption is not the true for some access patterns. An optimized allocation decision may be preferred to place the new block in a different location or to not allocate the new block based on other criteria.

High bandwidth networking systems introduce some challenges for standard cache implementations. Some types of data traffic (i.e., access) patterns generate high transaction rates on networking applications that work inefficiently with a non-discriminative allocation policy, as well as standard least recently used (LRU) cache replacement policies.

One such traffic pattern is high rate streaming I/O where an absence of available cache allocation consumes more of the available DRAM bandwidth than the DRAM bandwidth available for the traffic pattern. By high rate is meant a rate relative to the DRAM bandwidth and/or relative to the bandwidth generated by a compute node because a given compute node would have lower level caches to filter most of the generated bandwidth seen at the last level cache.

The second traffic pattern characterizing network traffic is high rate of random accesses (accesses to data with no localization that cause excessive cache misses) to short data structures (with short being relative to a size of a cache block, i.e., smaller than the size of a cache block for a given implementation), generated by transactions such as classification lookups or atomic operations.

Described is a dynamically adaptive last level cache population policy that uses a modified least recently used scheme and an additional state bit in the cache tags. This cache policy provides a new approach both for allocation criteria based on modified LRU replacement algorithm, random probabilities, and an additional state provide by a state bit that implements a finite state machine per cache block. The combination of these elements is programmed in profiles selected at the transaction level, and can address problems related to standard cache LRU policies for certain traffic patterns.

According to an aspect, a method of implementing an adaptive last level allocation policy in a last level cache in a multicore system includes receiving a stream having a stream type for allocating as new cache blocks for storage in the cache, accessing a selected profile from plural profiles that define allocation actions, according to a least recently used type of allocation and based on a cache action, a state bit, and stream type for the new cache blocks, and allocating the new stream according to the selected profile for a selected least recently used (LRU) position in the cache.

Other aspects include devices, systems and computer program products tangibly stored on computer readable non-transitory storage devices such as volatile and nonvolatile memory and persistent storage devices/systems.

Other features and advantages of the invention will become apparent from the following description, and from the claims.

DESCRIPTION

1 Exemplary System Overview

The system described in this section (with reference to FIGS. 1A and 1B) provides an overview of various aspects of a parallel processing environment that can be used for a variety of the techniques described in other sections.

A multicore processor can be manufactured as a chip containing multiple processing engines or cores. Using multiple cores to process applications can provide greater computing throughput and also lower power. There are many challenges to building a multicore processor. These include the challenges of how to connect the cores to each other efficiently, how to manage data sharing between the cores, how to supply data from input-output devices to the cores in a coherent manner, and how to construct operating systems for multicore processors. Bus based multicore chips use a bus to connect the cores, but buses may be a throughput bottleneck and may also consume a lot of power. An alternative way to connect the cores is to use a point-to-point network such as a mesh network or a ring network. Networks such as a mesh have switches arranged in a grid pattern in which neighboring switches are connected to each other. When the cores include a switch component for a network such as a mesh, the cores can be laid out in a simple rectangular tiled pattern. Such multicore chips are called tiled multicore processors. Because the conductor paths are short in tiled multicore processors, signals can travel short distances when neighboring cores need to communicate. Tiled multicore processors generally consume lower power than bus based multicore processors.

Figure 1A:
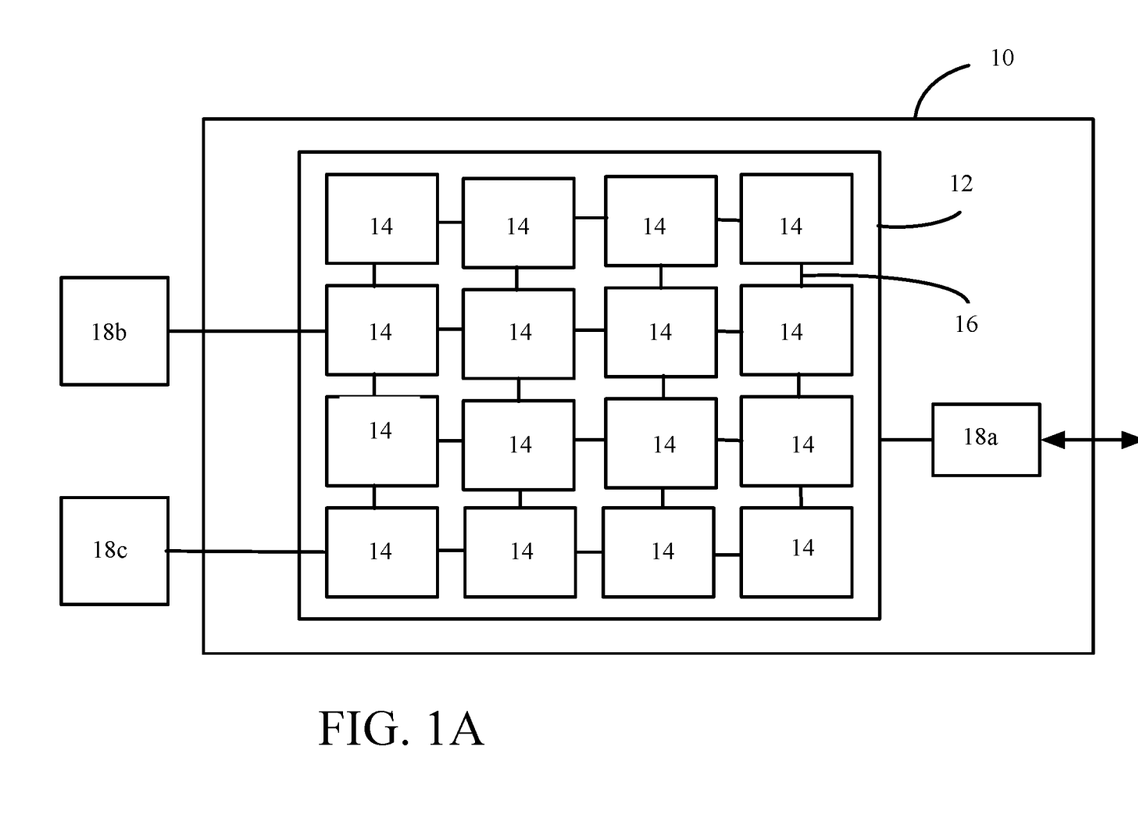
FIG. 1A is a block diagram of a tiled integrated circuit.

Referring to FIG. 1A, an integrated circuit 10 (or "chip") includes an array 12 of interconnected tiles 14. Each of the tiles 14 is a functional unit that includes a processor (or "processor core") and a switch that forwards data from other tiles to the processor and to switches of other tiles over data paths 16. The switch is coupled to the processor so that data can be sent to or received from processors of other tiles over the communication fabric formed by the switches and data paths. The integrated circuit 10 includes other on-chip circuitry such as input/output (I/O) interface circuitry to couple data in and out of the circuit 10, and clock distribution circuitry to provide clock signals to the processors of the tiles.

The integrated circuit 10 shown in FIG. 1A includes a two-dimensional array 12 of (e.g., rectangular) tiles 14 with data paths 16 between neighboring tiles to form a mesh network. The data path 16 between any two tiles can include multiple conductor paths (or "wires") to support parallel channels in each direction. Optionally, specific sets of conductors between two tiles can be dedicated to different mesh networks that can operate independently.

Alternative network configurations include buses, rings, crossbars, hypercubes, trees, or networks having paths that extend to diagonal neighbors or to tiles that are multiple rows or columns away. Other configurations include higher dimensional mesh topologies. For example, multiple layered integrated circuits or other three-dimensional configurations can be used to form networks in which the connections form a cube of network nodes. In some implementations, a switch coupled to a processor forwards data to and from the processor or between neighboring processors over data paths of a one-dimensional interconnection network such as ring network.

The data paths 16 from one or more tiles at the edge of the network can be coupled out of the array 12 of tiles 14 (e.g., over I/O pins) to an on-chip device 18a, an off-chip device 18b, or a communication channel interface 18c, for example. Multiple conductors of one or more parallel channels can be multiplexed down to a fewer number of pins or to a serial channel interface. For example, the conductors for one or more channels can be multiplexed onto a high-speed serial link (e.g., SerDes) or a memory controller interface (e.g., a memory controller for DDR or Dynamic RAM—also known as DRAM). The memory controller can be implemented off-chip or in logic blocks within a tile or on the periphery of the integrated circuit 10.

The following exemplary implementations are described in the context of tiles that have the same structure and functionality. Alternatively, there can be multiple "tile types" each having different structure and/or functionality. For example, tiles that couple data off of the integrated circuit 10 can include additional circuitry for I/O functions.

Figure 1B:
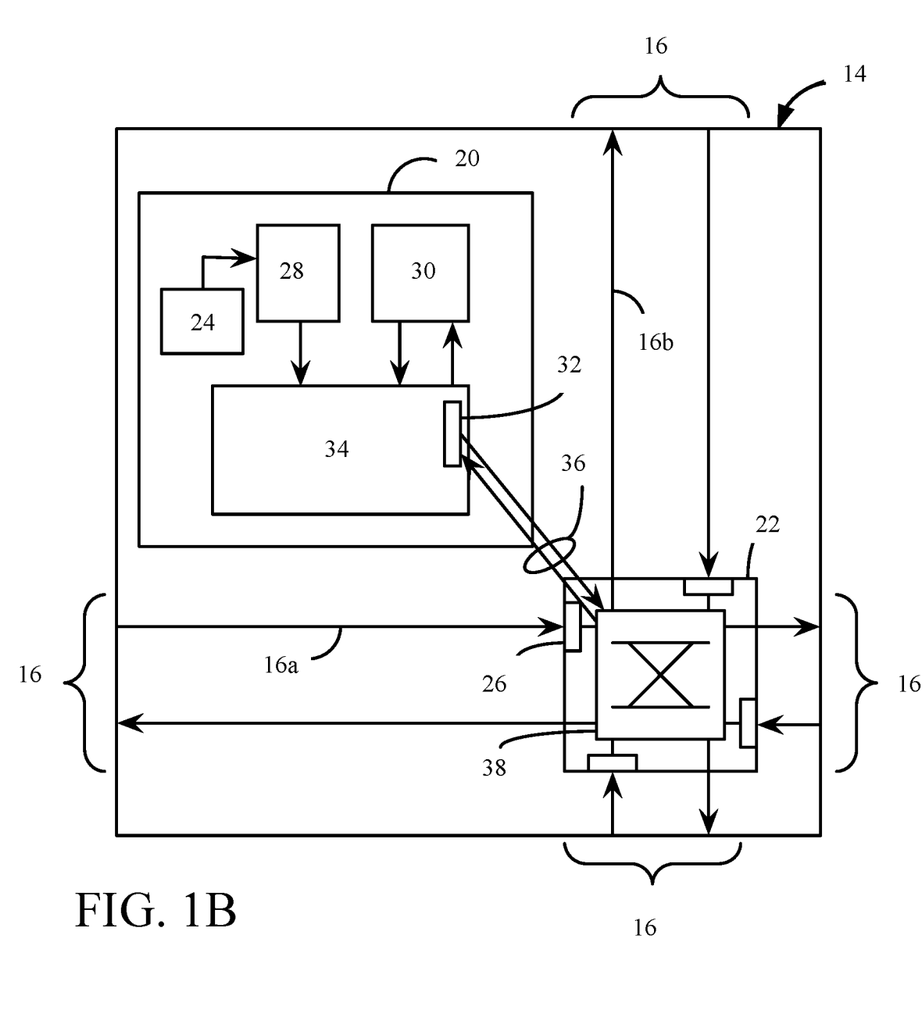
FIG. 1B is a block diagram of a tile.

Referring to FIG. 1B, a tile 14 includes a processor 20, a switch 22, and sets of incoming conductors 16a and outgoing conductors 16b that form the data paths 16 for communicating with neighboring tiles. The processor 20 includes a program counter 24, an instruction memory 28, a data memory 30, and a pipeline 34. The processor 20 can use any of a variety of pipelined architectures. The pipeline 34 includes pipeline registers, functional units such as one or more arithmetic logic units (ALUs), and temporary storage such as a register file. The stages in the pipeline 34 include, for example, instruction fetch and decode stages, a register fetch stage, instruction execution stages, and a write-back stage.

Either or both of the instruction memory 28 and data memory 30 can be configured to operate as a cache for off-chip memory. The cache hierarchy can take many forms, and the description here is just one example. For example, the instruction memory 28 includes an instruction cache that caches instructions, which can be a level 1 instruction cache (L1I), and the data memory 30 includes a data cache that caches data, which can be a level 1 data cache (L1D). Both the L1I cache and the L1D cache can be backed up by a level 2 unified cache (L2U) that is usually larger in size than either of the L1 caches. The caches are controlled by a cache controller.

On a cache miss from the L1I or L1D caches, the L2U cache is checked. If the data is found in the L2U cache, then a cache miss can be averted. If the instruction or data is not found in the L2U, then the instruction or data is fetched from outside the tile. Typically, the processor checks the cache in another tile called the home tile for that particular address that missed. In some implementations, the L2U caches in the other tiles serve as a large distributed L3 cache. The L3 cache may be the last level cache, i.e., the cache that communicates with external memory using one or more main memory controllers.

In other implementations, there is a directory in the home tile and a unified L3 cache on the path to the memory controller. If the home tile directory has an entry for the data item (within a home location of a home cache in the home tile), the home tile directory can signal the owner of the data item to send the data item) to the requesting tile. If even the home tile directory causes a cache miss, then, as an example, the home tile directory handles the cache miss by sending the cache request to external memory (to DRAM typically, possibly through the L3 cache) and obtains the data item from the external memory. The cache miss from the requesting tile gets turned into a message that traverses the network to get to the home tile. Similarly, the miss from the home tile to DRAM traverses the network.

Sometimes, instead of checking a home tile directory on a cache miss to the cache within a tile, the request is sent directly outside the chip to external DRAM memory.

The tile 14 can also include a cache controller that performs actions to ensure that cache coherence is maintained in the whole chip. Typically, the cache coherence information for a given cache line is maintained at the home tile for that cache line. The coherence information is stored in a directory to store the current state of the cache line. The home location, within a home tile, for a given cache line can also be determined by hashing the cache line address to yield a home location. The home location can also be modified as the program executes. Data that has a home location in a home cache of a particular home tile is said to be "homed in" that particular tile.

The processor 20 can be multithreaded and/or have capabilities of a Very Long Instruction Word (VLIW) processor, a superscalar processor, or a vector processor.

Together the switches 22 in a multicore chip provide the communications infrastructure for all the cores. Switches can be built in many ways. As one example, the switch 22 includes input buffers 26 for temporarily storing data arriving over incoming conductors 16a, and switching circuitry 38 (e.g., a crossbar fabric) for forwarding data to outgoing conductors 16b or the processor 20. The input buffering provides pipelined data channels in which data traverses a data path 16 from one tile to a neighboring tile in predetermined number of clock cycles (e.g., a single clock cycle). This pipelined data transport enables the integrated circuit 10 to be scaled to a large number of tiles without the need to limit the clock rate to account for effects due to conductor lengths such as propagation delay or capacitance. (Alternatively, the buffering could be at the output of the switching circuitry 38 instead of, or in addition to, the input.)

The switch provides "dynamic routing" for communication messages that result from cache misses or other cache coherence related transactions. In dynamic routing, circuitry in the switch 22 determines which input and output ports to connect based on header information in the data that is being dynamically routed during execution. A tile can send a message to any other tile by generating the appropriate address information in the message header. The tiles along the route between the source and destination tiles use a predetermined routing approach. For example, one routing approach is shortest Manhattan Routing (also known as dimension-ordered routing), which refers to routing along a first dimension followed by a second perpendicular dimension (where the distance between two points is measured by adding line segments that are arranged in a grid like pattern, with the line segments at right angles to each other, and not the straight line joining the two points). The number of hops along a route is deterministic but the latency depends on the congestion at each tile along the route. Examples of data traffic that would typically use dynamic routing are memory access traffic (e.g., to handle a cache miss) or interrupt messages.

The switch 22 includes dedicated circuitry for implementing the dynamic routing. Each tile has a set of data paths, buffers, and switching circuitry for dynamic routing, forming a "dynamic network" for the tiles. There can also be multiple static networks and multiple dynamic networks operating independently. For example, one of the dynamic networks can be reserved as a memory network for handling traffic between tile memories, and to/from on-chip or off-chip memories. Another network may be reserved for data associated with a "supervisory state" in which certain actions or resources area reserved for a supervisor entity.

The switch 22 is coupled to the processor 20 over processor coupling wires 36. To improve the latency of dynamic routing switches the tiles can use route prediction in the switches. With route prediction, a message that comes into an input port of the switch is routed to a given destination port of the switch based on a predicted port number. The prediction for a packet coming in from a given input port can be selected based on the route taken by the previous packet from that input port. If the hardware in the tile (e.g., prediction circuitry) determines that the prediction was incorrect, the hardware can take a few extra cycles to make the right routing decision based on the information in the packet header.

Other optimizations include using wide network channels. A tile can send single word messages containing both the packet header and the data value. The packet header includes information such as route information.

A tile 14 can include various types of memory modules to serve as the instruction memory 28, data memory 30, or as a local memory store for other types of information such as control information for the tile. There can be a small SRAM bank in each tile in addition to a large SRAM bank. There can also be a larger DRAM bank in each tile. Each tile can have mode indicators used to select among these banks. Any of the memory modules can be treated as a cache for a larger memory store outside the tile 14 or the integrated circuit 10. Such external memory (e.g., DRAM) is accessible over high bandwidth paths of one or more dynamic networks. The amount of memory can be chosen to roughly balance the areas devoted to processing and memory, and to match the memory access time and the processor clock.

Functions such as virtual address translation, caching, global shared memory and memory protection can be implemented by any combination of hardware and software (e.g., processor instructions). A tile 14 can include a translation lookaside buffer (TLB) to translate virtual addresses as they come out of the processor 20 on each tile 14. Separate TLBs for instruction and data can also be used. A mode bit for each can turn off translation. Events such as cache miss or translation fault can trigger a trap or interrupt to the processor 20, so that the processor 20 can handle the event in software (using instructions executed by the processor).

The software running on the processor 20 can also use various mechanisms to speedup TLB miss handling. For example, a software TLB miss handler can also maintain a software cache of TLB entries. This software cache used by the software TLB miss handler is also called a TSB.

For example, there can be multiple trap lines (conductors carrying trap signals) to the processor 20. Alternatively, there are few trap lines, but there is a trap vector that the processor 20 can access which encodes the type of trap that occurred. There is a mode indicator, which can allow selecting whether the software or the hardware handles these events. A hardware cache tag file can export a hit/miss status to the software rather than stalling the processor pipeline.

An array 12 of tiles 14 can include one or more interface modules coupled to a switch on the periphery of the array to transfer data to and from an external device such as an I/O device. The interface module includes circuitry to mediate between the communication protocols of the dynamic networks and a communication protocol of the external device. An interface module is able to connect to ports of any of the dynamic network switch points on a tile, but any given interface module may only be connected to a subset of the dynamic networks through a subset of the switch points.

The configuration of the circuitry in a tile 14 can be controlled by local control information stored in the tile. For example, a module in the tile can be turned on or off (to save power for example) or configured into a variety of modes (e.g., to set protection levels) based on the state of a "mode indicator" (e.g., one or more bits) stored in a register or other memory store.

Various parts of the multicore chip, for example, a tile, a processor in a tile, a processor and caches in a tile, can also be selectively shut off to save power. When doing so, the system takes care to selectively shut off or activate certain parts of the tile that are needed for other parts of the system to operate. For example, if a tile's cache is the home cache for a given set of cache lines, then that tile's cache controller and cache might be powered up. Alternatively, they might take a set of actions before they are powered down. These actions can transfer responsibility of processing to other parts of the chip.

As line rates of traffic increasingly rise, it is often not possible to timely execute all of the required applications completely in software. For such cases, a processor 20 can include accelerator circuitry to speedup processing for special functions such as security, compression, network packet processing, etc. The accelerator circuits (accelerators) can be connected directly to a tile or a core, or they can be connected to the periphery of an interconnection network (for example, like an I/O device). The accelerators can also be full participants in coherence protocols and can contain caches. They can also use cache coherence transfers to transfer data between them and the other cores, or they can use DMA (direct memory access) to transfer data from the caches on the rest of the chip to the accelerator memory or caches.

A software system for the tiled integrated circuit 10 includes a compiler that is able to schedule instructions for the processors in each of the cores.

An exemplary operating system (OS) for the integrated circuit 10 can include a Linux-like kernel or a similar kernel running on a single tile 14. The OS can be a symmetric multiprocessing OS such as SMP Linux which can run on one or more tiles. Threads of SMP Linux running on multiple tiles communicate with each other through coherence shared memory. Alternatively, the OS can be a distributed OS running on multiple tiles sending messages to each of the processes on each of the tiles.

Another software system component that can be included is a hypervisor layer that provides physical device drivers for each physical device. The hypervisor also sets protection levels in the hardware. The hypervisor is responsible to multiplex various operating systems on the physical hardware and physical devices.

Application writers can program each of the cores or tiles in the multicore chip using languages such as C. Similarly, they can program multiple tiles by writing parallel programs using libraries such as pthreads, Message Passing Interface (MPI), or parallel languages such as OpenMP.

The software system can also include libraries that provide additional function such as interfaces that allow the user to access various hardware features directly, such as the registers related to the network, special purpose registers, synchronization operations, user-level message passing, etc.

Various performance enhancements can be made to the distributed cache coherent environment for a multicore processor system. The caches with associated cache controllers contained in the cores (or tiles) form a larger shared cache system for the memory references to an external memory from any of the cores. In other words, a union of all caches (for example, Level 2 caches) in the system serves as a higher level unified cache (for example, level 3 cache). The cache controllers handle cache access and maintain coherence among caches of different cores. Latency reduction techniques for the larger shared cache system are applied to further optimize the memory operation performance. Several features also enable the software executing on the processors of the cores to control cache partition and utilization from the processor and the I/O system while maintaining coherence.

2 Implementing Dynamically Adaptive Last Level Cache Population Policy, Using Modified LRU Scheme and an Additional State Bit in the Cache Tags.

Described below is an allocation policy that allocates new blocks according to profiles for selected LRU positions. The allocation policy in particular enables allocating at any LRU position on read-miss or write miss event or upgrading an LRU position by a selected offset on a read-hit event or write hit event depending additional state information. This allocation policy provides efficient filtering and learning mechanisms for a set associative cache, as allocating new blocks or cache lines (synonymous) first at any selected LRU position, which avoids degrading important cache data at higher LRU positions and minimizes thrashing, while later updating the LRU position on additional read-hits or write-hits, increases a protection level of frequently accessed search structures and minimizes excessive access requests sent to the DRAM bank. Further protection from thrashing can be applied by using selected probability for allocating a new line in the cache.

In contrast with standard LRU replacement policy, a last level cache population policy that uses this modified LRU scheme when combined with a state bit that modifies a replacement scheme according to the status of the state bit (cleared or set) and replacement according to various cache scenarios provides a flexible state machine per line for dynamic protection of cache lines in cache miss scenarios or selection among LRU alternatives on cache hit scenarios. The use of the state bit thus selects a replacement policy that limits cache thrashing from the lowest LRU position. Additionally, use of the state bit improves circuit implementation and timing by considering the state of the state bit rather than considering the entire set locking for the victim way in a single clock cycle. The state bit is used as a decision modifier for read hit or write hit scenarios, and can select any desired policy according to a pre-transaction profile.

The modified allocation policy can prevent a static lock from starving different cache ways by using the state bit that is reset in response to a programmable random probability. When the LRU 0 position is occupied by a set state bit, by using the state bit the cache allocation is eliminated, and by a resetting the state bit according to the programmable probability it may be allowed again in the future. That is, at some programmed probability. The criteria used to provide the programmed probability is a SOC setting tuning, the state bit gets reset and any adverse impact of a static lock is minimized. In addition, multiple ways in the set may be possible candidates for eviction instead of the way in the LRU position 0 (LRU0) that has the state bit asserted, but not addressed due to timing considerations. By timing considerations is meant that in a single clock cycle the circuit has to determine which way is the victim LRU way out of multiple options. However, when only the LRU0 way is the victim this consideration is avoided and thus timing is improved. If multiple ways with state bits are considered to be victims, in addition to selecting the LRU position to insert the new allocation, the resulting circuit design is complex.

The mechanism provides for rotation of LRU positions, where the LRU 0 position with state bit set is upgraded to position K−1, and the higher LRU positions 1 to K−1 are downgraded one position to K−2 to 0 respectively. The next line that has been in LRU position 0 is exposed and that line's state bit is observed, so that the LRU position 0 victim candidate for next time provides the state bit of another way. This mechanism provides fast response in finding the next victim (cache line that is to be next evicted) with no state bit protection, in addition to the low probability of clearing the state bit. The state bit can either prevent a static lock from starving a set or provide a rotation of LRU positions. That is, there is both a probability to clear the state bit to remove the protection from the way in LRU position 0, otherwise rotating the way by upgrading it to LRU position K−1 and exposing the state bit of another way, such that the set is not fully blocked by the state bit of a single cache way which happens to be in LRU 0 position.

Figure 2:
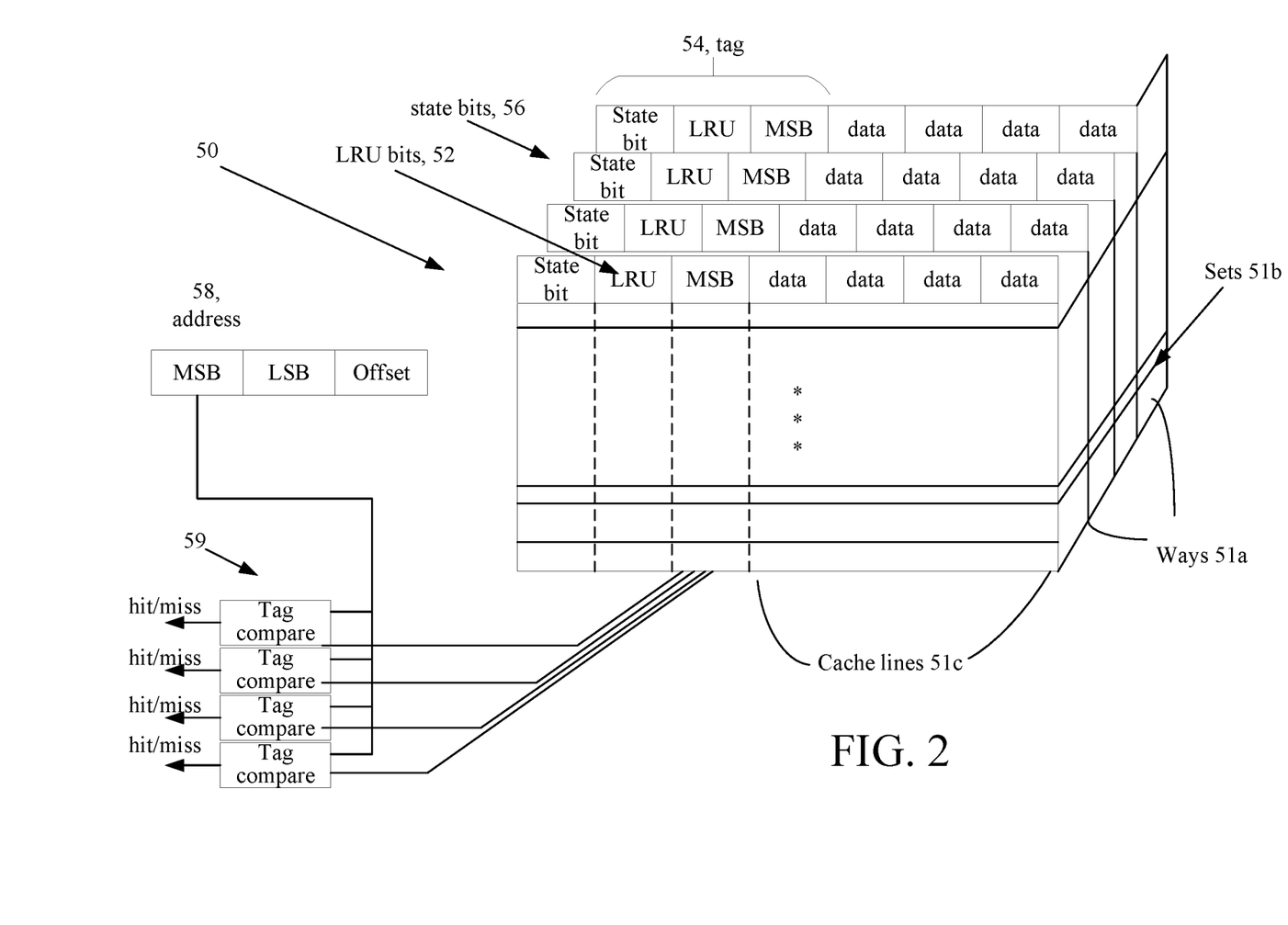
FIG. 2 is a schematic diagram of a set associative cache memory layout.

Referring now to FIG. 2, a multi, e.g., a sixteen-way set associative cache 50 with plural ways 51a and sets 51b for storage of cache lines 51c is shown. For the purposes of the discussion herein, the cache 50 is used as a last level cache, i.e., the level closest to memory e.g., L3. The cache 50 has a full complement of conventional LRU bits 52 included in a tag 54, as shown. The so called "full LRU bits" included are conventional LRU bits 52 that are used with a conventional LRU policy for a multi-way set associative cache. The tag 54 in the multi-way set associative last level cache, also includes an additional bit 56 that is combined with the conventional LRU bits 52 as part of the cache tag. This additional bit is referred to here as the "state bit." FIG. 2 also shows tag compare circuitry 59 that compares tag information and the MSB from an address 58 to the determined policy used in the cache 50.

The state bit 56 is combined with a conventional LRU cache replacement policy that uses the full LRU bits 52. In addition, per transaction, a profile number is provided for selecting the replacement or allocation policy to be applied as a function of read/write, hit miss, and set or cleared state bit in case of a hit. The combination of the LRU bits 52 and the state bit 56 provides a flexible state machine per cache line that can be used for dynamic protection in cache miss scenarios or dynamic selection among LRU alternatives in cache hit scenarios. This modified LRU policy (see FIGS. 3 and 4) enables allocating on a cache miss at any selected position or not allocating at all (whereas the conventional LRU policy only allocates at the top position). Additionally, this modified LRU policy enables moving up or down a position on a cache hit to any LRU position relative to a current LRU position including deallocation (whereas the conventional LRU policy moves the way back to the top position). By top position in a conventional LRU policy is meant adding a signed number to the current LRU position which can be positive upgrade up to the top position or negative downgrade to down to the bottom position.

The additional state bit 56 together with programmable random probabilities tune the modified LRU policy, and thus provide long term learning so that the most important data remains cached, and DRAM accesses are minimized for various types of data streams having different traffic patterns. Additional profile programmable decisions can select between two options of modified LRU configurations according to the selected programmable probability.

One such traffic pattern is high rate streaming I/O (where high is relative to system capacity particularly DRAM bandwidth) where an absence of available cache consumes more DRAM bandwidth than the DRAM bandwidth available for the traffic pattern. The Lifetime for streaming data refers to two intervals. The first interval is from a time data is written to memory until the data is used once (e.g., read from memory), after which the data are no longer needed by the system. The second interval is from the time that the data was read from memory, then followed by a memory release and reallocation it is reused for additional traffic payload and written again to the memory (assuming dynamic memory allocation). At the system level, the data may have been stored in a dynamically allocated buffer address, which is released after reading, and later space in the buffer is reallocated for use by other data. The time interval from release and new allocation of the same buffer address is the above mentioned time interval.

When DRAM bandwidth is a limiter for high performance, the last level cache (LLC) e.g., L3 caches has to allocate lines for traffic payload and associated contexts, and the product of payload size times the lifetime in may exceed the shared last level cache capacity.

With a standard LRU implementation, such an implementation would get close to zero hit rates due to thrashing of data in the first interval (after the data is written, but before the data is read). This is a well-known avalanche phenomenon. A conventional solution to this problem is not to cache streaming data at all (resulting in full bandwidth on the DRAM interface for such streaming data.

The techniques described herein enable caching of streaming data and provides a mechanism to substantially avoid avalanche phenomenon, by keeping unread data from eviction and spilling new incoming streaming data selectively to external memory. These techniques result in achieving hit rates for streaming data that are proportional to cache capacity compared to a needed capacity to store the streaming data for the full lifetime. For example, if a 1 MB cache needs to store 1.5 MB of streaming data, the 1 MB cache shall achieve 66% hit rate instead of nearly 0%.

A second traffic pattern characterizing network traffic is high rate of random accesses, (with high being the dominant factor in overall requests arriving at the cache) to short data structures (with short being relative to a size of a cache block, i.e., smaller than the size of a cache block for a given implementation), generated by transactions such as classification lookups or atomic operations.

Consider when a database of an accessed table is much larger than the cache, and the access pattern is fully random, the standard LRU cache would keep trashing old data and allocating new data, but without using the new data again, which is potentially wasting DRAM bandwidth, e.g., using twice the bandwidth of a full cache block, (i.e., evicting an old dirty line and allocating new clean line) for reading only a short data structure.

In such a situation, a minority of search structures may be accessed frequently and need to be cached (i.e., allocated full cache lines even though the structure size is less than a cache line), while a majority of other search structures that are accessed randomly, would in any event rarely hit, the cache for a second read before being evicted. The conventional LRU implementations with non-discriminating allocation would result in high cache thrashing and low hit rate. However, by choosing not to allocate using such a LRU implementation such a flow results in zero hit rate and possibly high access pattern to the same DRAM bank, resulting in low performance due to the DRAM electrical constraints. By using a random probability to allocate and selecting a relatively low LRU position to allocate such transactions on read-miss events, protect valuable cached data from being thrashed by read transactions from earlier accessed addresses. Further, by upgrading the cache position on read-hit events, protect the frequently used addresses only in the event that these addresses are accessed again from the time of initial allocation before being evicted. Additionally, when read-miss is generated by a processor with lower level cache, it would be preferred not to allocated an entry for it in the last level cache.

Other traffic patterns include standard program instructions, standard program data, controlled acceleration chaining, e.g., accelerator data being explicitly read from external memory to cache with allocation and protection, accelerator intermediate result upgrading a LRU position, and an accelerator chain final result being explicitly written to external memory without allocating in cache in case of a write-miss (to prevent thrashing of important data) or downgrading in case of a write-hit Described below is a modified LRU scheme that is a profile based allocation, with policies that are defined for actions such as a Read-Miss, a Write-Miss, a Read-Hit and a Write-Hit for patterns of data traffic. This Profile based allocation policy may also choose write through behavior (e.g., typically for special use cases such as storage to persistent non-volatile storage/memory) in which modified data written into a cache are at the same time written into a main memory location, such that by always updating DRAM (memory), the memory has the current version of the modified cache line, and by having the current version of a cache line leaves the cache line in cache in clean state (e.g., not dirty or changed from main memory).

Figure 3:
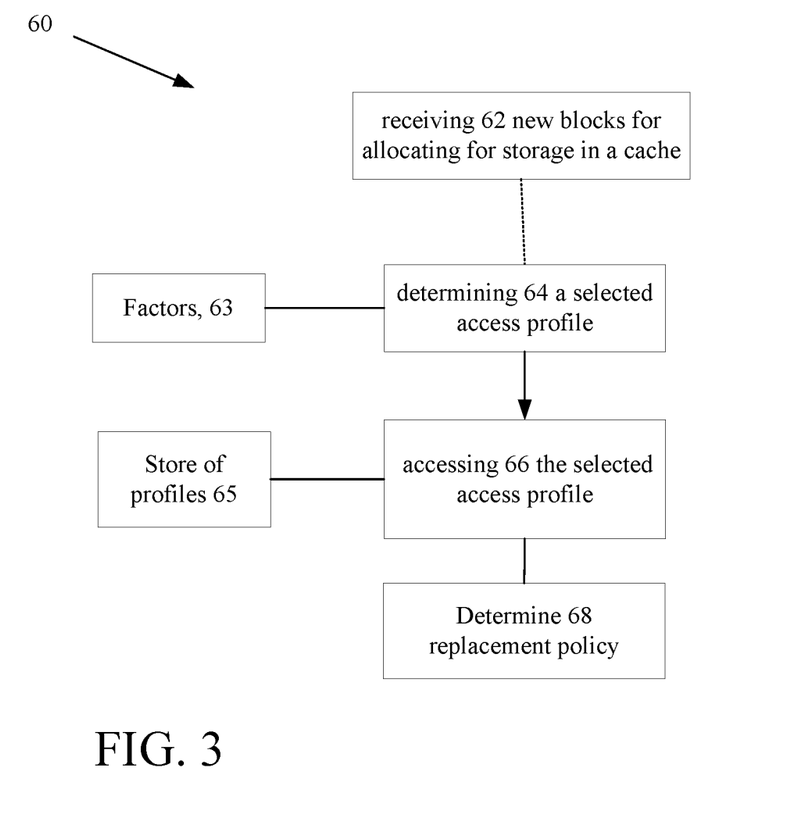
FIG. 3 is a flow chart of a generalized adaptive LRU policy.

Referring to FIG. 3, an implementation of a last cache level allocation policy 60 for use SOC such as in a multicore system as discussed above includes receiving 62 new blocks for allocating for storage in a LLC cache. Determining 64 a selection of a profile according to factors 63, e.g., a least recently used type of allocation and based on a cache action, a state bit, and traffic pattern and handling the new block according to the selected profile for a selected LRU position in the cache. The policy accesses 66 the selected profile from plural, stored 65 profiles that define allocation actions. The technique selects 68 a replacement policy according to a data traffic pattern type with one data traffic pattern type being, for example, a high rate of streaming IO data, and another being a high rate of random accesses to short data structures and another being program related data or instruction cache misses.

Miss Events

Figure 4:
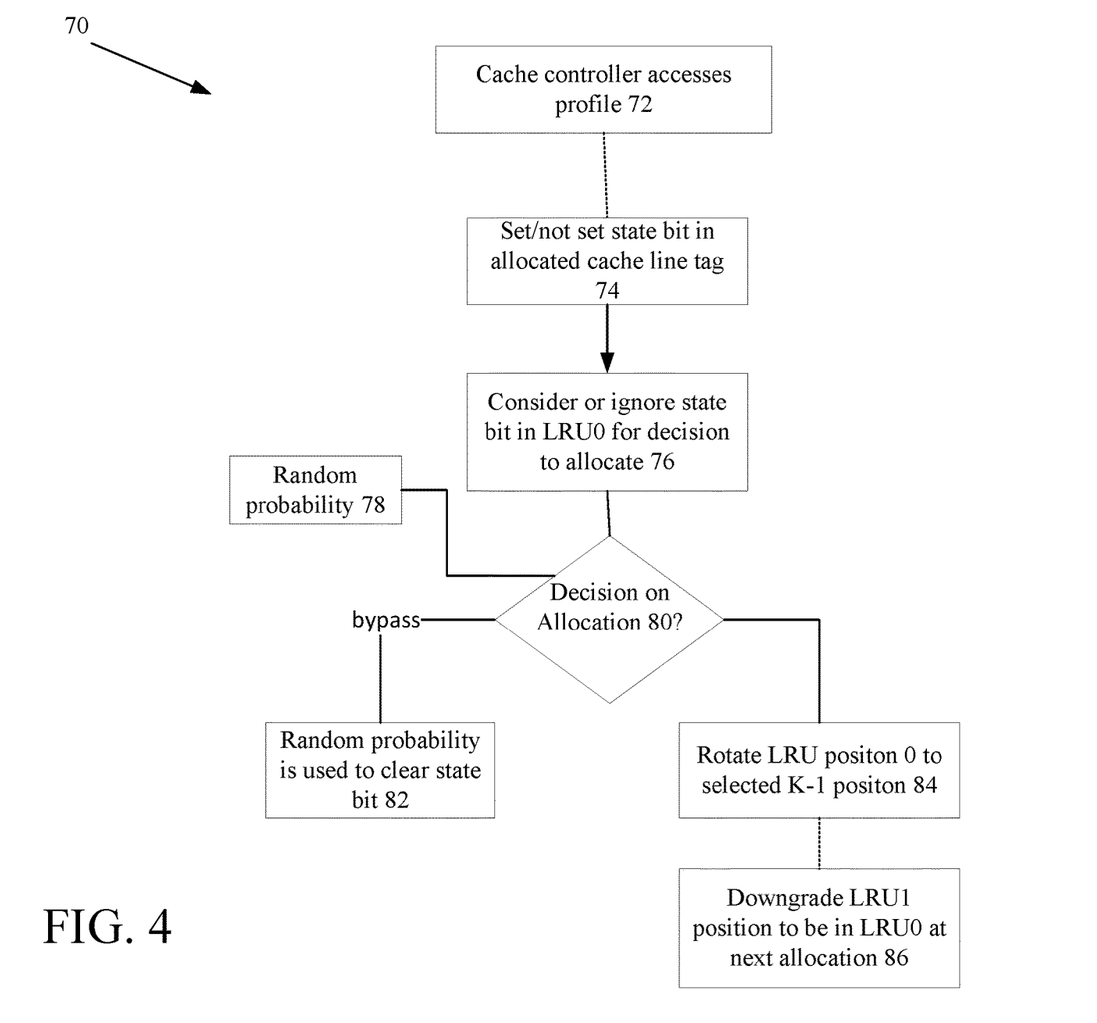
FIG. 4 is a flowchart of processing for cache miss events.

Referring now to FIG. 4, an exemplary process 70 for miss events is shown. For miss events, the following actions occur and each profile provides separately programmable allocation decisions for read or write. A Cache controller executing a modified LRU policy 70, access 72 a corresponding profile.

The Cache controller executing a modified LRU policy 70 determines whether to bypass or allocate a programmed LRU position, and in the case of allocation whether to set or clear the state bit. The modified LRU policy uses a random probability for this decision.

In the case of allocating, the modified LRU policy sets (or does not set) 74 the state bit 56 in the allocated cache line tag according to the corresponding profile. Thus, the modified LRU policy, considers or ignores 76 the state bit 56 in LRU0 according to the corresponding profile when providing a decision 80 whether to allocate a cache line or bypass the cache for a cache line.

In the case where no allocation is made (e.g., bypass), a random programmed probability is used to clear 82 the state bit 56 of the LRU0 position, meaning that clearing of the set bit is randomly performed, so as to not provide any statistical bias to the decision to clear. In the case where the state bit 56 in LRU position 0 is not cleared, the modified LRU policy rotates 84 the LRU0 to a selected one of positions K−1 (where K is smaller or equal to number of ways N) from position 0, and downgrades 86 LRU1 to be in position LRU0 in the next time (i.e., the next time this set is addressed by another transaction to prevent starvation of the set by exposing new candidate victim cache lines.

Hit Events

Figure 5:
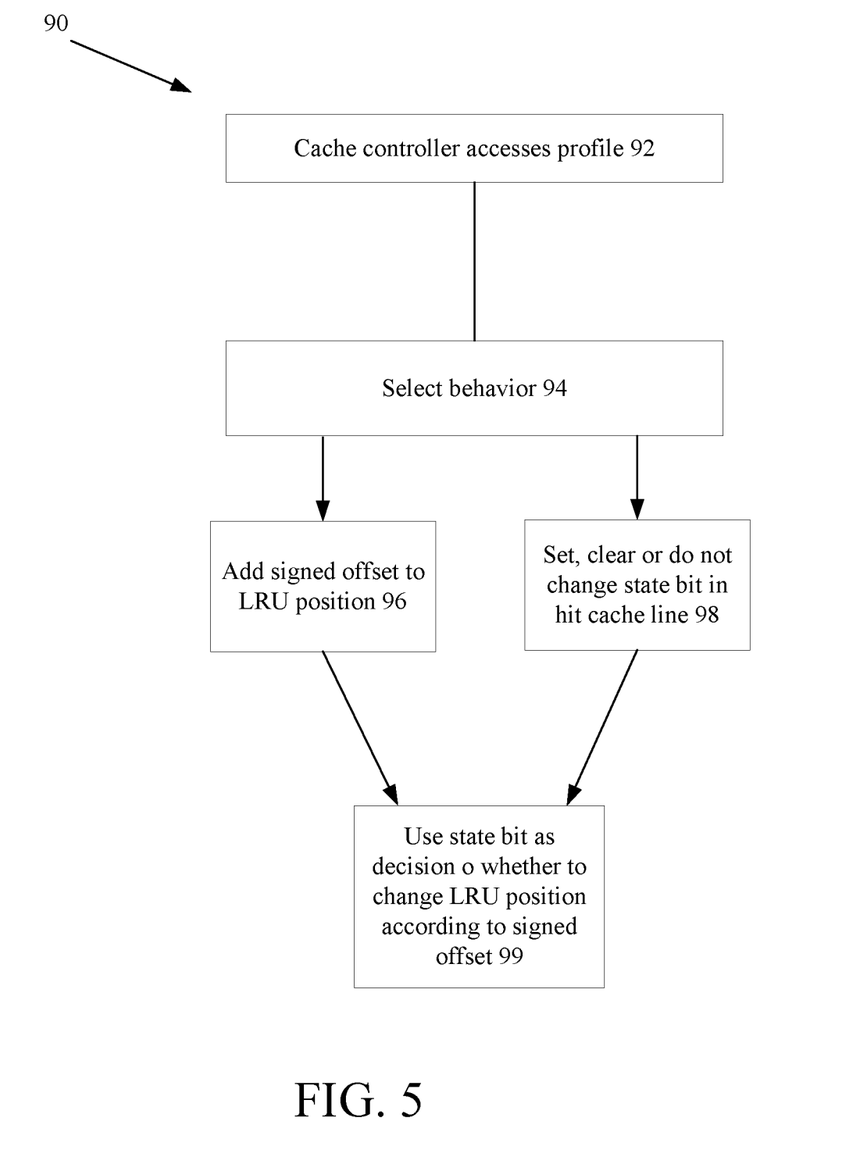
FIG. 5 is a flowchart of processing for cache hit events.

Referring now to FIG. 5, an exemplary process 90 for miss events is shown. On hit events the following actions occur and are separately configurable for both read or write events. The cache controller accesses a profile 92 and selects a behavior 94.

The modified LRU policy applies an offset value to the LRU position by adding a signed offset value to the LRU position 96. The signed offset value could increase or decrease or not change the LRU position of a hit way in the set associative cache. The sum of the LRU position and the signed offset at a maximum position is truncated to correspond to the top LRU position, (as in the conventional LRU policy), but the minimum position would be the LRU 0.

The modified LRU policy determines 98 whether to set, clear or don't impact the state bit 56 in the hit cache line. The policy determines this based on the value of the state bit and the profile that was selected based on a previous value of the state bit, which provides full control to set/clear/keep based on combination of previous next values. Random probability can be used for this decision to apply the policy at less than 100% of the cases or to select between programmed policies by a given probability. For example, on search lookup it may be decided to allocated at some LRU position with one probability and not to allocate otherwise, meaning the LRU position is negative. Similarly, on a hit it may be decided to clear the next state bit and add one value with some probability or set the next state bit and add another value to the LRU position. The random probability enables better control over statistical behaviors.

The modified LRU policy uses 99 the state bit 56 to decide whether to change LRU position by the signed offset or keep the LRU position unchanged.

The selection of the cache profile is based on a field that is provided with the transaction. This field indicates which programmable profile to use for the particular transaction. Typically, the field would be marking a data stream with differentiated characteristics that may be hinted by devices coupled to the integrated circuit 10 or the array 12 of interconnected tiles 14 based on identifying selected flows.

For example, by identifying flows through a connection, e.g., (PCIe (PCI Special Interest Group) transaction layer packet (TLP) processing hints). The selection of the cache profile may also be hinted by lower cache events, such as a software-initiated cache line eviction (which would avoid allocation), directory originated evictions (which would allocate as victim cache), programmable behavior for memory ranges, and other criteria. Other criteria can be for example based on certain types of accelerators in a chained operation that may allocate and protect in middle operations, and bypass allocation from the last accelerator because final data would not be accessed for a relatively long period of time (in comparison to other potential allocations) and therefore should not trash other useful data.

Figure 6:
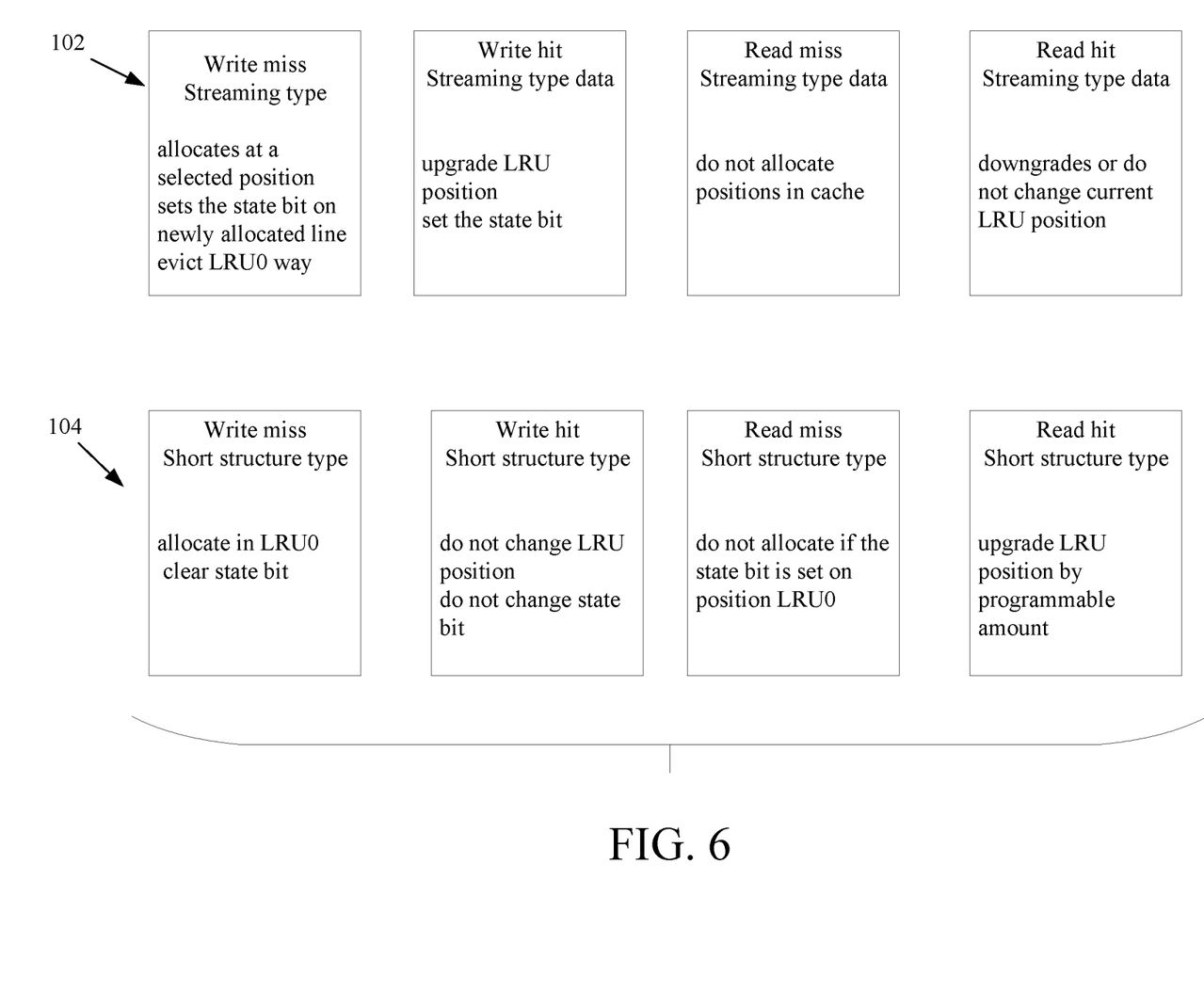
FIG. 6 is a diagrammatical view of cache profiles.

Referring now to FIG. 6, cache profiles 102, 104 are shown for two examples, streaming data, e.g., high rate streaming IO and network traffic, e.g., of a high rate of random accesses to short data structures.

Examples of Streaming Data Cache Profiles

An example set of actions for configuration of a cache to handle streaming data that typically gets written once and later is read once after long latency (lifetime) is as follows for these cache profiles:

On write-miss, when LRU0 state bit 56 is clear, the policy allocates at a selected position and sets the state bit 56 on the newly allocated line and the LRU0 way gets evicted.

On a write-hit, the policy upgrades the LRU position and sets the state bit 56.

On a read-miss the policy does not allocate positions in the cache.

On read-hit the policy downgrades or does not change a current LRU position and clears the state bit.

Examples of Short Structure Cache Profiles

An example set of actions for a configuration of a cache policy to handle short, e.g., search structures, from huge tables, with the search structures having a small minority of frequently accessed addresses that should be kept in cache, while a majority of random addresses should bypass the cache to prevent thrashing is as follows for these cache profiles:

On write-miss allocate in LRU0 (if partial, merge with DRAM data), clear state bit 56, which is preferred here not to allocate on write miss, in which a write-miss allocate in LRU0 is an infrequent update of the search table.

On write-hit do not change LRU position, and clear the state bit 56.

On read-miss do not allocate if the state bit 56 is set on position LRU0. This will cause the programmable probability to clear the state bit 56 or cause rotation of the LRU position) or allocate at LRU position 0 if state bit 56 was cleared.

On read-hit upgrade an LRU position by programmable amount and clear the state bit.

These are profiles that are accessed by the modified LRU scheme (cache replacement) policy in which these profiles define the policies for Read-Miss, Write-Miss, Read-Hit and Write-Hit with initial state zero or one according to specified patterns of data traffic.

The below tables more fully describe the flexibility of programming each profile.

The tables are as follows:
Table 1 Read miss
Table 2 Write miss
Table 3 Read hit with state=0
Table 4 Write-hit with state=0
Table 5 Read hit with state=1
Table 6 Write-hit with state=1

For each such event there is a probability to choose between two sub-policies (high and low), and select the next state bit value. Not allocating on a miss is selected by putting negative value in the initial LRU position. The State bit at LRU 0 protects the cache line from eviction on write-miss, when it happens rotate LRU ways 0-3 to expose a new state bit.

TABLE 1

Read miss

| Parameter | Description | size (b) |
|---|---|---|
| Read Miss Low Order | The LRU structure index to which read transactions should allocate, in case their corresponding binary randomization results in '0'. Negative indexes (i.e. when MSB is '1') would mean that the transactions will not be allocated. | 5 |
| Read Miss High Order | The LRU structure index to which read transactions should allocate, in case their corresponding binary randomization results in '1'. Negative indexes (i.e. when MSB is '1') would mean that the transactions will not be allocated. | 5 |
| Read Miss High Order Probability | The probability of a read transaction that get a miss in the cache, to be allocated to the Read Miss High Order rather than to the Read Miss Low Order. | 16 |
| Read Miss Allocation State | Specifies the initial state of the cache entry's State Bit, after a read transaction gets allocated into it. | 1 |

TABLE 2

Write miss

| Parameter | Description | size (b) |
|---|---|---|
| Write Miss Low Order | The LRU structure index to which write transactions should allocate, in case their corresponding binary randomization results in '0'. Negative indexes (i.e. when MSB is '1') would mean that the transactions will not be allocated. | 5 |
| Write Miss High Order | The LRU structure index to which write transactions should allocate, in case their corresponding binary randomization results in '1'. Negative indexes (i.e. when MSB is '1') would mean that the transactions will not be allocated. | 5 |
| Write Miss High Order Probability | The probability of a write transaction that get a miss in the cache, to be allocated to the Write Miss High Order rather than to the Write Miss Low Order. | 16 |
| Write Miss Allocation State | Specifies the initial state of the cache entry's State Bit, after a write transaction gets allocated into it. | 1 |

TABLE 3

Read hit with state = 0

| Parameter | Description | size (b) |
|---|---|---|
| Read Hit0 Low Delta | A signed addition to LRU structure index of a cache entry, that is used when a read transaction gets a hit with that entry, in case the State Bit of that entry was '0', and the binary randomization for the transaction has resulted in '0'. The index resulting from adding the delta will saturate from both directions, either at 0 (if the delta is negative) or at 15 (if the delta is positive). | 5 |
| Read Hit0 High Delta | A signed addition to LRU structure index of a cache entry, that is used when a read transaction gets a hit with that entry, in case the State Bit of that entry was '0', and the binary randomization for the transaction has resulted in '1'. The index resulting from adding the delta will saturate from both directions, either at 0 (if the delta is negative) or at 15 (if the delta is positive). | 5 |

TABLE 3-continued

| | Read hit with state = 0 | |
|---|---|---|
| Read Hit0 High Delta Probability | The probability of a read transaction that get a hit in the cache with an entry who's State Bit is '0', to apply the Read Hit0 High Delta on the entry that it hits, rather than to the Read Hit0 Low Delta. | 16 |
| Read Hit0 New State | Specifies the new state of the cache entry's State Bit, after a read transaction hits it, while the current State Bit is '0'. | 1 |

TABLE 4

| | Write-hit with state = 0 | |
|---|---|---|
| Write Hit0 Low Delta | A signed addition to LRU structure index of a cache entry, that is used when a write transaction gets a hit with that entry, in case the State Bit of that entry was '0', and the binary randomization for the transaction has resulted in '0'. The index resulting from adding the delta will saturate from both directions, either at 0 (if the delta is negative) or at 15 (if the delta is positive). | 5 |
| Write Hit0 High Delta | A signed addition to LRU structure index of a cache entry, that is used when a write transaction gets a hit with that entry, in case the State Bit of that entry was '0', and the binary randomization for the transaction has resulted in '1'. The index resulting from adding the delta will saturate from both directions, either at 0 (if the delta is negative) or at 15 (if the delta is positive). | 5 |
| Write Hit0 High Delta Probability | The probability of a write transaction that get a hit in the cache with an entry who's State Bit is '0', to apply the Write Hit0 High Delta on the entry that it hits, rather than to the Write Hit0 Low Delta. | 16 |
| Write Hit0 New State | Specifies the new state of the cache entry's State Bit, after a write transaction hits it, white the current State Bit is '0'. | 1 |

TABLE 5

| | Read hit with state = 1 | |
|---|---|---|
| Read Hit1 Low Delta | A signed addition to LRU structure index of a cache entry, that is used when a read transaction gets a hit with that entry, in case the State Bit of that entry was '1', and the binary randomization for the transaction has resulted in '0'. The index resulting from adding the delta will saturate from both directions, either at 0 (if the delta is negative) or at 15 (if the delta is positive). | 5 |
| Read Hit1 High Delta | A signed addition to LRU structure index of a cache entry, that is used when a read transaction gets a hit with that entry, in case the State Bit of that entry was '1', and the binary randomization for the transaction has resulted in '1'. The index resulting from adding the delta will saturate from both directions, either at 0 (if the delta is negative) or at 15 (if the delta is positive). | 5 |
| Read Hit1 High Delta Probability | The probability of a read transaction that get a hit in the cache with an entry who's State Bit is '1', to apply the Read Hit1 High Delta on the entry that it hits, rather than to the Read Hit1 Low Delta. | 16 |
| Read Hit1 New State | Specifies the new state of the cache entry's State Bit, after a read transaction hits it, white the current State Bit is '1'. | 1 |

TABLE 6

| | Write-hit with state = 1 | |
|---|---|---|
| Write Hit1 Low Delta | A signed addition to LRU structure index of a cache entry, that is used when a write transaction gets a hit with that entry, in case the State Bit of that | 5 |

TABLE 6-continued

| | Write-hit with state = 1 | |
|---|---|---|
| | entry was '1', and the binary randomization for the transaction has resulted in '0'. The index resulting from adding the delta will saturate from both directions, either at 0 (if the delta is negative) or at 15 (if the delta is positive). | |
| Write Hit1 High Delta | A signed addition to LRU structure index of a cache entry, that is used when a write transaction gets a hit with that entry, in case the State Bit of that entry was '1', and the binary randomization for the transaction has resulted in '1'. The index resulting from adding the delta will saturate from both directions, either at 0 (if the delta is negative) or at 15 (if the delta is positive). | 5 |
| Write Hit1 High Delta Probability | The probability of a write transaction that get a hit in the cache with an entry who's State Bit is '1', to apply the Write Hit1 High Delta on the entry that it hits, rather than to the Write Hit1 Low Delta. | 16 |
| Write Hit1 New State | Specifies the new state of the cache entry's State Bit, after a write transaction hits it, white the current State Bit is '1'. | 1 |

3 Additional Systems

Various features of the techniques described herein can be implemented on the multi-core processor based systems as described in U.S. Pat. Nos. 7,577,820, and 7,805,575, and commonly-owned U.S. patent application Ser. Nos. 12/028,002, 12/582,443, and 12/885,957, each of which is incorporated herein by reference in its entirety.

Various techniques described herein can be implemented in additional types of integrated circuit architectures. For example, some techniques can be used in an integrated circuit with a single processor core, or an integrated circuit in which multiple processor cores include respective computation units interconnected by a shared interconnection network such as a bus, or a pipelined bus, in addition to a tiled integrated circuit architecture in which multiple processor cores are interconnected by a network of switches connected to respective computation units. Some techniques can be used in parallel processing environments that include multiple processes executing on a single processor, or multiple single-core and/or multi-core processors.

It is to be understood that the foregoing description is intended to illustrate and not to limit the scope of the invention, which is defined by the scope of the appended claims. Other embodiments are within the scope of the following claims.

What is claimed is:

1. A system implementing an adaptive allocation policy in a cache comprises:
   a multicore system configured to:
      receive data of a data type for allocating as new cache blocks for storage in the cache;
      determine a selection of a profile from plural profiles, with each of the plural profiles defining plural allocation actions and with the plural actions being defined according to a least recently used (LRU) type of allocation policy, and with the selected profile determined based at least in part on a type of cache action, a cache tag that includes LRU bits according to the LRU allocation policy, the data type of the received data, and a state bit having a status that is used to determine whether to modify the LRU allocation policy; and
   allocate positions in the cache for the new cache blocks according to the selected profile.

2. The system of claim 1 wherein each profile of the plural profiles is programmed separately for read-miss, write-miss, read-hit, and write hit with the state bit having a state of a logic 0 or a logic 1.

3. The system of claim 1 wherein the data type is a stream type, and the selection of a profile is based on the stream type, with stream type including one of IO traffic, search, program instructions, data, and accelerator chained operations.

4. The system of claim 1 wherein for each of the plural profiles, and with the state bit state having a logic state value of a logic 0 or a logic 1, there are at least two different actions from a plurality of different actions for configuring the allocation policy; and the method further comprises:
choosing by the multi-core system between the at least two actions according to a programmable probability of changing the value of the state bit.

5. The system of claim 1 wherein the cache is a last level cache that includes a plurality of ways, including an LRU 0 way, and the selected profile is a write miss for streaming type of data, which selected profile allocates at a selected position, sets the state bit on a newly allocated line, and evicts a line in the LRU 0 way.

6. The system of claim 1 wherein the selected profile is a write hit for streaming type data that upgrades an LRU position and sets the state bit.

7. The system of claim 1 wherein the data type is a stream data type, and the selected profile is a read miss streaming type data profile that causes the policy to not allocate positions in cache.

8. The system of claim 1 wherein the data type is a stream data type, and the selected profile is a read hit streaming type data that causes the policy to downgrade or not change a current LRU position and clear the state bit.

9. The system of claim 1 wherein the data type is a stream data type, and the selected profile is a write miss for a short structure type that causes the policy to allocate in an LRU0 position and clear the state bit.

10. The system of claim 1 wherein the data type is a stream data type, and the selected profile is a write hit for a short structure type that causes the policy to not change an LRU position and select a next value of the state bit.

11. The system of claim 1 wherein the selected profile is a read that causes the policy to not allocate if the state bit is set at a LRU0 position.

12. The system of claim 1 wherein the selected profile is a read hit for a short structure type that causes the policy upgrade a LRU position by a programmable amount.

13. The system of claim 1 further configured to:
select a replacement policy according to a data traffic pattern type.

14. The system of claim 13 wherein the data traffic pattern type is a rate of streaming IO data.

15. The system of claim 13 wherein the data traffic pattern type is a rate of random accesses to short data structures.

16. The system of claim 13 wherein the data traffic pattern type is selected from the group consisting of high rate of random accesses to short data structures, high rate of streaming IO data, with high rate being relative to DRAM bandwidth, program instructions, program data, controlled acceleration chaining.

17. A method of implementing a last level allocation policy in a last level cache in a multicore system, the method comprising:
receiving data of a data type for allocating as new cache blocks for storage in the cache;
determining a selection of a profile from plural profiles, with each of the plural profiles defining plural allocation actions and with the plural actions being defined according to a least recently used (LRU) type of allocation policy, and with the selected profile determined based at least in part on a type of cache action, a cache tag that includes LRU bits according to the LRU allocation policy, the data type of the received data, and a state bit having a status that is used to determine whether to modify the-LRU allocation policy; and
allocating positions in the cache for the new cache blocks according to the selected profile.

18. The method of claim 17 wherein each profile of the plural profiles is programmed separately for read-miss, write-miss, read-hit, and write hit with initial state bit state of a logic 0 or 1, and the data type is a stream type, and determining a profile is based on the stream type, with stream type including one of IO traffic, search, program instructions, data, and accelerator chained operations and for each profile, there are at least two different actions from a plurality of different actions for configuring the allocation policy; and the method further comprises:
choosing by the multi-core system between the at least two actions according to a programmable probability of changing the value of the state bit.

19. A computer program product tangibly stored on a non-transitory computer readable storage medium for implementing a last level allocation policy in a last level cache in a multicore system, the computer program product comprising instructions to cause the multicore system to:
receive data of a data type for allocating as new cache blocks for storage in the cache;
determine a selection of a profile from plural profiles, with each of the plural profiles defining plural allocation actions and with the plural actions being defined according to a least recently used (LRU) type of allocation policy, and with the selected profile determined based at least in part on a type of cache action, a cache tag that includes LRU bits according to the LRU allocation policy, the data type of the received data, and a state bit having a status that is used to determine whether to modify the LRU allocation policy; and
allocate positions in the cache for the new cache blocks according to the selected profile.

20. The computer program product of claim 19 wherein each profile of the plural profiles is programmed separately for read-miss, write-miss, read-hit, and write hit cases, with an initial state bit state of a logic 0 or 1, and the computer program product further comprises instructions to cause the multicore system to:
choose between the at least two actions according to a programmable probability of changing the value of the state bit.

* * * * *